3,716,589
PROCESS FOR THE SYNTHESIS OF
2,6-DIMETHYLPHENOLS
Takeshi Kotanigawa, Mitsuyoshi Yamamoto, and Katsuyoshi Shimokawa, Sapporo, Japan, assignors to Agency of Industrial Science & Technology, Tokyo, Japan
No Drawing. Filed Nov. 19, 1969, Ser. No. 878,263
Claims priority, application Japan, Nov. 27, 1968, 43/87,569
Int. Cl. C07c 37/16
U.S. Cl. 260—621 R  6 Claims

ABSTRACT OF THE DISCLOSURE

A process is disclosed for methylating the ortho-position of phenols by reacting a mixed gas of phenols and methyl alcohol in the presence of a composite catalyst. The composite catalyst is a ferrite having the formula $MFe_2O_4$ where M is zinc, magnesium, calcium, barium, cobalt, nickel, chromium, manganese, cadmium, copper, silver, copper-zinc, magnesium-zinc, and silver-zinc.

---

This invention relates to a process for the synthesis of 2,6-dimethylphenols. More particularly, this invention relates to the process for the methylation of the ortho-position of phenols by catalytically reacting together a mixed gas of phenols and methyl alcohol in the presence of a two-component or three-component composite catalyst consisting of (a) one or two of an oxide of magnesium, calcium, barium, cobalt, nickel, chromium, manganese, cadmium, zinc, copper and silver and (b) iron oxide and in the presence of an oxidizing agent at a temperature in the range of 300°–450° C.

The well-known compounds having alkyl groups at 2- and 6-positions of phenols which are useful in industry include ortho-cresol, 2,6-dimethylphenol, 2,6-di-tert-butyl-4-methyl-phenol, etc. Of these compounds, ortho-cresol has a wide variety of utility as an intermediate for various organic industrial chemical products, and 2,6 - di - tert-butyl-4-methylphenol has been used as an anti-oxidant for a lubricating oil. Also, 2,6-dimethylphenol is, at present, an important substance as a raw material for the heat-resistance high molecular substances such as poly-2,6-dimethylphenylene oxide and the like, as well as an anti-oxidant, an antifungal agent and a modified phenol resin and, therefore, the method for the synthesis thereof is presently noted with much interest.

Heretofore, it was known that 2,6-dimethylphenols can be prepared by reacting a phenol with methanol in the presence of magnesium oxide as a catalyst at a temperature of from 475 to 600° C. (U.S. Pat. No. 3,446,856).

The primary object of this invention is to provide a process for the synthesis of 2,6-dimethylphenols which permits the production of the desired phenols in high yield at a reaction temperature lower than that used in the well-known process.

Another object of this invention is to provide a process for the synthesis of 2,6-dimethylphenols which is excellent in selectivity for the desired phenols.

A further object and features of this invention will be explained in detail by referring to the disclosure and examples as given hereinafter.

The present inventors searched for a process which makes it possible to produce 2,6-dimethylphenols at relatively low temperatures and pressures and found an improved process for the synthesis of 2,6-dimethylphenols which produces the desired ortho-methylated compound with a selectivity of more than 95% but produces almost no metha- or para-methylated phenols as by-products, said improved process comprising catalytically reacting together a mixed gas of phenols and methyl alcohol as a methylating agent under low pressure at a temperature of from 300° C. to 450° C. in the presence of a two-component or three component composite catalyst consisting of (a) one or two of an oxide of zinc, magnesium, calcium, barium, cobalt, nickel, chromium, manganese, cadmium, copper or silver and (b) iron oxide and in the presence of an oxidizing agent.

The phenol which can be used as a starting material of this invention includes phenol, ortho-, metha- and para-cresols, 3,5-dimethylphenol, 2-tert-butyl-4-methylphenol and a mixture thereof.

Methyl alcohol is generally used as a methylating agent, but methyl alcohol containing Formalin may also be used.

The catalyst as described above can effectively be used as a ferrite containing zinc, magnesium, calcium, barium, cobalt, nickel, chromium, manganese, cadmium, copper or silver. This catalyst is represented by the formula $MFe_2O_4$ wherein M represents one of the above metals. Similar effect can also be obtained when M represents two of the above metals, for example, copper-zinc, magnesium-zinc or silver-zinc.

When a catalyst which is a single component such as ZnO, CaO, CuO, $Fe_2O_3$ or the like and is not a composite catalyst, said catalyst is reduced with an organic gas synthesis of 2,6-dimethylphenols, excellent ortho-selectivity is obtained whereas the percent degree of conversion is extremely low and hence almost no desired substance is produced. In particular, when CuO is used alone as a catalyst, saiid catalyst is reduced with an organic gas present in the reaction system to copper metal in a short period of time whereby it becomes inactive.

The catalyst used in the present invention can be prepared by one of the various methods. One method comprises mixing an aqueous solution of a chloride, nitrate, or sulfate of the above metals with an aqueous solution of a chloride, nitrate or sulfate of iron and adding to the resulting aqueous mixture an alkali such as aqueous ammonia thereby coprecipitating the desired metal hydroxides. In case where zinc is used as a metal, the pH of the aqueous mixture must be adjusted to 6.5 since zinc is amphoteric in nature. The metal hydroxides thus obtained are then filtered, washed with water, dried and thereafter calcined at a temperature near the reaction temperature (300° C. to 450° C.) or a temperature of approximately 100° C. higher than the reaction temperature. For example, when a mixture of zinc hydroxides and iron hydroxides is obtained, the hydroxide obtained is calcined, after being dried, at a temperature of about 400° C. for a period of about three hours while passing the air. The resulting catalyst may be used by supporting on a carrier.

The catalyst thus obtained was measured by X-ray diffraction by means of the powder method and found to be the ferrite represented by the formula $MFe_2O_4$ wherein M represents one or two of the above metals.

The reaction of a phenol with a methylating agent can be effected at a temperature between 300° C. and 450° C., preferably, between 330° and 380° C. At a temperature below 300° C., the selectivity is increased whereas the percentage reaction is decreased. On the other hand, at a reaction temperature above 450° C., neutral oils such as benzene are formed by dehydroxylation of the phenol. In addition, there are observed both a remarkable dealkylation due to water formed in the reaction and a remarkable decrease in the rate of recovery because of the decomposition of the unreacted alcohol.

It was found, however, that the presence of an appropriate amount of water in the reaction system prolongs the life of the catalyst remarkably. Generally, the addition of water to the reaction system of the reaction between an alcohol and a phenol is considered as promoting a reverse reaction, but, on close investigation of the reaction products it was found that a part of water formed in the reaction had been consumed by oxidation of the gas evoluted in the reaction. Thus, in the process of this invention, the presence of water in the reaction system is useful for the oxidation of a reducing gas, which will normally reduce the catalyst, thereby preventing the catalyst from reduction and hence the life of the catalyst is prolonged. Accordingly, it is preferred to add previously an appropriate amount of water or an oxidizing agent to the reaction system if the amount of water produced in the reaction is considerably low level. A similar result can also be obtained by using more than 10 moles of methyl alcohol per one mole of phenol in place of the above oxidizing agent. Thus, the process of this invention produces almost no 4-methylated compound even if a large amount of methyl alcohol is used with respect to the phenol reactant because of the relatively low reaction temperature ranging from 300° C. to 450° C., and is superior in the ortho-selectivity. Also, in case where somewhat low selectivity to 2,6-dimethylphenols is obtained in the process of this invention, the unreacted materials most of which are mono- ortho-substituted compounds, can be recovered and thereafter converted to the desired 2,6-dimethylphenols whereby 2,6-dimethylphols can be produced almost quantitatively.

The process of this invention is further illustrated by the following examples but is not limited thereto.

EXAMPLE 1

Liquid reactants consisting of phenol-methyl alcohol were supplied to a reaction system at a flow rate of 5 ml. per hour and gasified. The resulting reactants were passed over 4 g. of a two-component catalyst consisting of ZnO (50 mole percent) and $Fe_2O_3$ (50 mole percent) together with nitrogen gas as a carrier, the flow rate of the carrier gas being 20 ml. per minute which is the lower limit for preventing the reverse flow of the mixed gas. The results obtained were as shown in Table 1.

It is noted, upon comparison of the results obtained in Experiment No. 10 with those in No. 16, that the production of the neutral oil increases at reaction temperatures higher than approximately 350° C. With respect to the molar ratio of methyl alcohol/phenol, better result is obtained in No. 10 than No. 15, but the proportion of 15 moles of methyl alcohol to 1 mol of phenol will not necessarily be required when it is taken into consideration that about 98% ortho-selectivity is obtained in both cases. This fact is more apparent in the case of the methylation of ortho-cresol as shown in Table 2.

TABLE 1

| Item | Experiment No. | | |
|---|---|---|---|
| | 10 | 15 | 16 |
| Reaction temperature (° C.) | 375 | 350 | 350 |
| Methanol/phenol (mole/mole) | 10 | 15 | 10 |
| Conversion of phenol (mole percent) | 97.2 | 98.7 | 95.5 |
| Selectivity (mole percent): | | | |
| Benzene | 1.5 | | |
| Toluene | 2.3 | 0.7 | 0.9 |
| Xylene | 1.3 | | |
| o-Cresol | 17.4 | 6.3 | 12.7 |
| 2,6-dimethylphenol | 76.7 | 91.3 | 85.2 |
| 2,4,6-trimethylphenol | 0.8 | 1.7 | 1.2 |

EXAMPLE 2

The procedure described in Example 1 was repeated using 4 g. of a two-component catalyst consisting of ZnO (50 mole percent) and $Fe_2O_3$ (50 mole percent) and liquid reactants consisting of methyl alcohol and ortho-cresol supplied at a rate of 5 ml. per hour, and the results obtained were as shown in Table 2 below. In this case, 2,6-dimethylphenol was obtained in 97.3% selectivity by using only three moles of methyl alcohol to 1 mole of o-cresol.

TABLE 2

| Item | Experiment No. | | |
|---|---|---|---|
| | 52 | 53 | 54 |
| Reaction temperature (°C.) | 375 | 375 | 350 |
| Methanol/o-cresol (mole/mole) | 3 | 5 | 5 |
| Conversion of o-cresol (mole percent) | 70.0 | 81.9 | 92.4 |
| Selectivity (mole percent): | | | |
| Benzene | | | |
| Toluene | 1.0 | 2.0 | 0.4 |
| Xylene | 0.7 | 1.4 | 0.3 |
| Phenol | 0.6 | | |
| 2,6-dimethylphenol | 97.3 | 96.1 | 98.6 |
| 2,4,6-trimethylphenol | 0.3 | 0.5 | 0.6 |

EXAMPLE 3

To determine the effect of the composition of the catalyst, liquid reactants consisting of an equimolar proportion of ortho-cresol and methyl alcohol was reacted together at a flow rate of 5 ml. per hour in the presence of various proportions of the catalyst. The results obtained were as shown in Table 3. With these catalysts, similar results were obtained at a temperature of 50 to 70° C. over the temperature of Examples 1 or 2. Also, it was found that the use of zinc oxide in excess is desirable to obtain 2,6-dimethylphenol effectively.

TABLE 3

| Item | Experiment No. | | | | |
|---|---|---|---|---|---|
| | 22 | 14 | 3 | 6 | 20 |
| Reaction temperature (° C.) | 400 | 400 | 350 | 420 | 400 |
| $ZnO/Fe_2O_3$ (mole/mole) | 10/90 | 30/70 | 50/50 | 80/20 | 95/5 |
| Conversion (mole percent) | 11.4 | 17.0 | 19.3 | 24.7 | 20.4 |
| Selectivity (mole percent): | | | | | |
| Benzene | 2.1 | 2.3 | | 0.8 | |
| Toluene | 2.7 | 4.4 | Trace | 1.6 | Trace |
| Xylene | 1.4 | 1.7 | | 1.0 | |
| Phenol | 10.3 | 5.3 | 1.2 | 4.3 | 2.1 |
| 2,6-dimethylphenol | 83.5 | 86.1 | 98.8 | 90.5 | 96.5 |
| 2,4-dimethylphenol | Trace | Trace | Trace | 1.7 | 1.3 |
| 2,4,6-trimethylphenol | | | | Trace | Trace |

EXAMPLE 4

The catalysts were prepared so as to provide a composition of $MFe_2O_4$. (The composition $MFe_2O_4$ was also confirmed by the pattern of X-ray diffraction.) Liquid reactants consisting of methanol-phenol was supplied, over 4 g. of each of the catalyst prepared above, at a rate of 8 ml. per hour together with a nitrogen gas as a carrier gas at a rate of 20 ml. per minute. The results were as shown in Table 4 below. When ortho-cresol is used as a raw material in place of the phenol used in this example, the selectivity for 2,6-dimethylphenol of more than 90% can be obtained by using methanol in the amount of one-half of these used for phenol.

TABLE 4

| M component of MFe₂O₄ | Mg | Ca | Ba | Cu | Ni | Cr | Co | 0.1 Cu / 0.9 Zn | 0.3 Cu / 0.7 Zn | 0.7 Cu / 0.3 Zn | 0.25 Mg / 0.75 Zn | 0.5 Mg / 0.5 Zn | 0.75 Mg / 0.25 Zn | 0.2 Ag / 0.8 Zn |
|---|---|---|---|---|---|---|---|---|---|---|---|---|---|---|
| Reaction temperature (° C.) | 350 | 350 | 350 | 350 | 350 | 350 | 350 | 350 | 350 | 350 | 350 | 350 | 350 | 350 |
| Methanol (mole)/phenol (mole) | 5 | 5 | 5 | 5 | 5 | 5 | 5 | 5 | 5 | 5 | 5 | 5 | 5 | 5 |
| LHSV¹ | 0.060 | 0.060 | 0.060 | 0.045 | 0.048 | 0.048 | 0.048 | 0.043 | 0.048 | 0.045 | 0.050 | 0.052 | 0.052 | 0.045 |
| Yield of reaction liquid (wt. percent) | 100 | 100 | 98.5 | 94.8 | 75.8 | 97.5 | 97.5 | 74.1 | 52.5 | 81.8 | 72.3 | 75.3 | 84.0 | 80.5 |
| Degree of conversion (mole percent) | 60.7 | 28.3 | 21.3 | 22.0 | 55.2 | 30.7 | 32.0 | 70.2 | 56.1 | 38.1 | 42.0 | 40.3 | 45.1 | 34.0 |
| Selectivity (mole percent): | | | | | | | | | | | | | | |
| Ortho-cresol | 65.6 | 85.0 | 90.0 | 90.5 | 54.0 | 65.2 | 91.2 | 68.4 | 80.0 | 88.5 | 63.2 | 70.0 | 65.6 | 65.9 |
| 2,6-xylenol | 33.7 | 15.1 | 10.0 | 9.5 | 46.0 | 33.6 | 8.8 | 31.6 | 20.0 | 11.5 | 36.5 | 29.5 | 34.0 | 34.1 |
| 2,4,6-trimethyl-phenol | 0.7 | | | | Trace | 1.2 | | | | | | | | |

¹ Phenol (mole)/catalyst (ml.)/hour.

EXAMPLE 5

The use of composite catalyst was explained in Example 4. This example, on the other hand, shows the result of experiments conducted by using catalysts which are not composite. The results in Table 5 below clearly show that sufficient amount of the desired substance cannot be obtained in each case because of the extremely low activity of the catalysts even at the reaction temperature above 380° C., a temperature desirable for the reaction in which the composite catalysts are used.

TABLE 5

| Catalyst | ZnO | CaO | CuO | Fe₂O₃ |
|---|---|---|---|---|
| Reaction temperature (° C.) | 400 | 400 | 400 | 400 |
| Methanol phenol (mole/mole) | 5 | 5 | 5 | 5 |
| Yields of liquid products (wt. percent) | 98.5 | 100 | 85.0 | 89.0 |
| Conversion (mole percent) | 5.2 | 3.8 | Trace | 4.4 |
| Selectivity (mole percent) | | | | |
| o-Cresol | 88.0 | 92.5 | | 90.0 |
| 2,6-xylenol | 12.0 | 7.5 | | 10.0 |
| 2,4,6-trimethylphenol | | | | |

EXAMPLES 6

Table 6 below shows the results obtained in experiments in which a small amount of water was added to the reaction system. The conditions used in this example were as follows:

Catalyst: CuFe₂O₄, 4g.
Methanol/phenol (molar ratio): 3
Flow rate: 8 ml. per hour
Reaction temperature: 350° C.

It is understood from the results shown in Table 6 that the life of the catalyst is considerably prolonged by previously adding a small amount of water to the reaction system.

TABLE 6

| Reaction Time (hour) | 1 | 2 | 10 | 20 | Over 30 |
|---|---|---|---|---|---|
| Conversion (mole percent): | | | | | |
| Phenol-methanol, 1:3 | 14.8 | 10.2 | | | |
| Phenol-methanol-water, 1:3:1.5 | 23.5 | 22.8 | 21.2 | 19.3 | 17.3 |

What is claimed is:

1. A process for methylating the ortho-position of phenols, said process consisting essentially of:
   (A) reacting at a temperature between 300° C. and 450° C. a mixed gas of phenols and methyl alcohol, in the presence of a composite catalyst;
      (1) said phenols selected from the group consisting of phenol; ortho-, meta-, and para-cresols; 3,5-dimethyl-phenol, and 2-tert-butyl-4- methylphenol;
      (2) said composite catalyst being a ferrite represented by the formula MFe₂O₄ where M is a member of the group consisting of zinc, magnesium, calcium, barium, cobalt, nickel, chromium, manganese, cadmium, copper, silver, copper-zinc; magnesium-zinc, and silver-zinc; and
   (B) recovering 2,6-dimethylphenols from the reaction product.

2. The process of claim 1 wherein M is copper-zinc.
3. The process of claim 1 wherein M is magnesium-zinc.
4. The process of claim 1 wherein M is silver-zinc.
5. The process of claim 1 wherein the reaction is effected using more than 10 moles of methyl alcohol per mole of phenol to prolong the life of the catalyst.
6. The process of claim 1 wherein the reaction is effected in the presence of water to prolong the life of the catalyst.

References Cited

UNITED STATES PATENTS 2,448,942 10/1948 Winkler et al. _____ 260—624 C
2,542,190 2/1951 Gorin et al. _____ 260—624 C BERNARD HELFIN, Primary Examiner N. MORGENSTERN, Assistant Examiner U.S. Cl. X.R.

260—624 C; 252—470, 472, 473, 474